Feb. 10, 1925.  
J. P. SEAHOLM  
CULTIVATOR SHOVEL  
Original Filed Oct. 3, 1916

1,525,960

Witness:  
Erich G. Eickow.

Inventor:  
John P. Seaholm  
by W.C. Jrdinston  
his Attorney.

Patented Feb. 10, 1925.

1,525,960

UNITED STATES PATENT OFFICE.

JOHN P. SEAHOLM, OF MOLINE, ILLINOIS, ASSIGNOR TO DEERE AND COMPANY, OF MOLINE, ILLINOIS, A CORPORATION OF ILLINOIS.

CULTIVATOR SHOVEL.

Application filed October 3, 1916, Serial No. 123,490. Renewed February 12, 1921. Serial No. 444,536.

*To all whom it may concern:*

Be it known that I, JOHN P. SEAHOLM, a citizen of the United States, residing at Moline, in the county of Rock Island and State of Illinois, have invented certain new and useful Improvements in Cultivator Shovels, of which the following is a specification, reference being had therein to the accompanying drawing.

My invention relates to cultivator shovels and has for its object to provide an improved attachment for holding the parts of the shovel in proper relation to each other, and attaching the shovel to the cultivator, which, however, will readily permit replacement of the blade portion thereof when necessary.

Referring to the drawings in which similar numerals indicate indentical parts—

Figure 2:
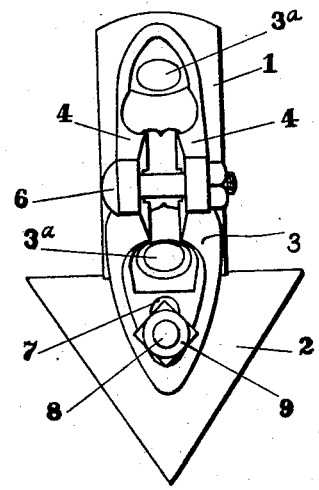
Figure 2 is a rear elevation of my device.

My improved shovel comprises three principal parts, a shank 1, a blade 2 and a support 3, the latter element serving to support the other two elements and hold them securely in proper relation to each other. The shank 1 and blade 2 are of the usual curved contour and are adapted to fit against the front face of the support 3 and to be firmly supported thereby in proper relation to each other, while the support 3 is adapted to be attached to the usual standard 5 of a cultivator beam. For attaching the support 3 to said standard, it is provided with rearwardly extending portions 4 between which the lower end portion of the standard 5 projects and is clamped by a bolt 6, which passes through the rearwardly extending portions 4, as best shown in Figure 2.

Figure 1:
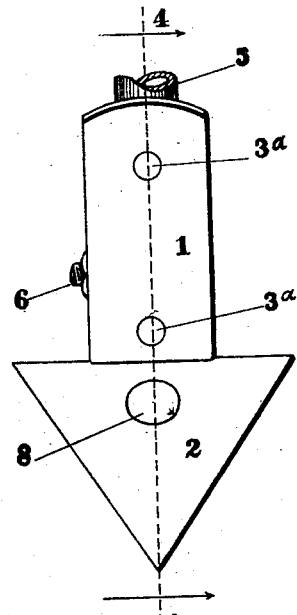
Figure 1 is a front elevation of my device attached to a cultivator standard.
Figure 3:
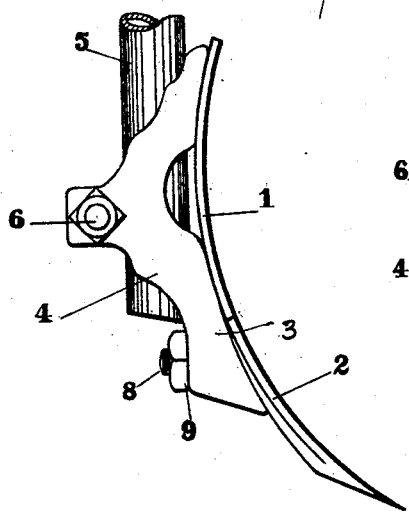
Figure 3 is a side elevation of Figure 1.
Figure 4:
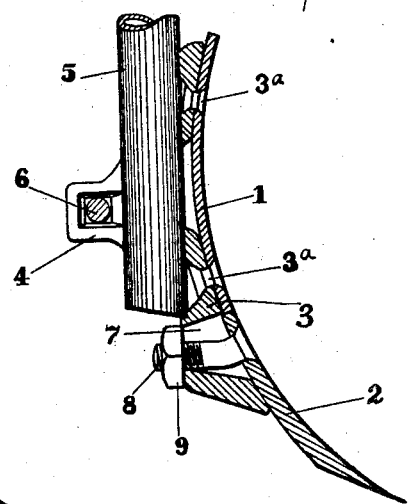
Figure 4 is a section on the line 4—4 of Figure 1.

Preferably the shank 1 is permanently secured to the upper portion of the support 3, as by rivets 3ª shown in Figures 1 and 4, but the blade 2 is removably secured to said support so that blade changes may readily be made when necessary or desirable. For the purpose of thus securing the blade 2 to said support, and for properly positioning it with relation to the shank 1, the lower portion of the support 3 is provided with a vertical slot 7 that extends fore and aft therethrough, and the surface of said support adjacent to the rear end of the slot is formed at an upwardly converging angle to the front surface of the lower portion of said support, which, as shown in Figures 3 and 4, is inclined forwardly and downwardly to hold the blade 2 at the proper inclination. A bolt 8, which is seated in the front face of the blade 2, passes rearwardly through the slot 7, its rear end being provided with a nut 9, which bears against the rear face of the support 3 adjacent to the slot 7, so that the nut, when screwed on the bolt, will draw the bolt rearwardly and thereby tightly bind the blade 2 against the front face of the support 3. At the same time, by reason of the angular relation to each other of the front and rear surfaces of the support 3, the tension applied to the bolt will tend to draw the blade upwardly so that its upper margin will fit closely against the lower margin of the shank 1. As clearly shown in Figures 3 and 4, the front face of the support 3 is shaped so that the front surfaces of the blade and shank will provide a continuous smooth face, and the bolt is so fashioned that the axis of its head or front end lies at an angle to the axis of its threaded rear end on which the nut is screwed, so that the head will fit squarely in a countersunk recess in the blade with its outer surface flush with the outer surface of the blade, while the nut 9 will thrust squarely against the rear face of the support. Preferably this angular relation of the head and rear ends of the bolt to each other is obtained by bending the body portion of the bolt in the manner shown in Figure 4, but a bolt having a straight body portion and a head disposed so that its axis is in angular relation to that of the body portion may also be used. In either case, the angular relation of the head and rear ends of the bolt to each other should be such that its front end will extend perpendicularly through the blade 2, while its rear end will be substantially perpendicular to the surface against which the nut 9 bears, so that, as above suggested, the outer face of the bolt head will lie flush with the outer surface of the blade and the nut will thrust squarely against the rear angularly related bearing surface. By making the front and rear surfaces of the lower end of the support 3 at an angle to each other it will be apparent that by turning the nut 9 the blade 2 is not only securely held against the inclined surface of the lower end of the support 3 but is drawn upward to a close joint with the lower end of the shank 1, presenting a continuous smooth surface of the blade and shank and preventing accumulation of grass or soil at the joint.

By the construction described, I have produced a cultivator shovel that is highly efficient, because it provides very secure holding means for the blade portion of the shovel, which is the part that receives the most wear and has to be replaced, and yet permits it to be readily removed, while at the same time it insures the proper positioning of the new part, all by the simple means of screwing the nut 9 upon the bolt 8.

Preferably the blade and shank are cut from strips of sheet metal, and in that way, and by employing a single support for the blade and shank, I not only provide a device that is simple and effective, but also effect economy of construction.

What I claim is:—

1. A cultivator shovel comprising a support adapted to be attached to a cultivator and having a forwardly and downwardly inclined front bearing surface, and a rear bearing surface at an upwardly converging angle to the lower portion of said front bearing surface, a shank secured to the upper portion of said front bearing surface, a blade adapted to abut at its upper margin against the lower margin of said shank, and having a rear surface that bears against the lower portion of said front bearing surface, and a bolt co-acting with the front and rear angularly related bearing surfaces of said support to draw the blade rearwardly and upwardly into close contact with the shank and hold it firmly against the front surface of said support, said bolt having a head end adapted to be seated in a recess in said blade and to lie flush with the outer surface thereof, and a rear end threaded to receive a nut adapted to thrust against the rear bearing surface of said support, the axes of the head and rear ends of said bolt being disposed in angular relation to each other.

2. A cultivator shovel comprising the following elements, a support adapted to be attached to a cultivator and having its lower front surface declined forwardly and its lower rear surface at an angle to the front surface, a shank rigidly secured to the support, a slot in the lower portion of the support, a blade in close contact with the lower edge of the shank and bearing against the lower front surface of the support, a bolt having a portion of its length at a right angle to the blade and connected thereto and extending through said slot, and a nut on said bolt thrusting against the lower rear surface of the support and adapted to be turned to hold the blade to the lower front surface of the support and to draw the blade into close contact with the shank.

3. A cultivator shovel comprising the following elements, a support adapted to be attached to a cultivator and having its lower front surface declined forwardly and its lower rear surface at an angle to the front surface, a shank rigidly secured to the support, a slot in the lower portion of the support, a blade in close contact with the lower edge of the shank and bearing against the lower front surface of the support, a bolt having a portion of its length at a right angle to the blade and connected thereto and having the remainder of its length substantially at a right angle to the lower rear surface of the support, said bolt extending through the slot and having a nut thereon thrusting against the lower rear surface of the support and adapted to be turned to hold the blade to the lower front surface thereof and to draw the blade into close contact with the shank.

In testimony whereof I affix my signature in presence of two witnesses.

JOHN P. SEAHOLM.

Witnesses:
  JESSIE SIMSER,
  W. G. DUFFIELD.